United States Patent [19]

Stent et al.

[11] Patent Number: 5,276,732
[45] Date of Patent: Jan. 4, 1994

[54] REMOTE WORKSTATION USE WITH DATABASE RETRIEVAL SYSTEM

[75] Inventors: Robert J. Stent, Westford; Norman E. Dorsey, Chestnut Hill, both of Mass.; James F. Mitchell, Windham, N.H.

[73] Assignee: Davox Corporation, Billerica, Mass.

[21] Appl. No.: 748,465

[22] Filed: Aug. 22, 1991

[51] Int. Cl.$^5$ .................... H04M 1/64; H04M 11/00
[52] U.S. Cl. ........................ 379/93; 379/97; 379/96; 379/88
[58] Field of Search ............ 379/93, 98, 97, 98, 379/88, 94, 92, 67, 216, 218

[56] References Cited

U.S. PATENT DOCUMENTS

| | | | |
|---|---|---|---|
| 4,656,624 | 4/1987 | Collins et al. | 379/94 |
| 4,797,911 | 1/1989 | Szlam et al. | 379/67 |
| 4,817,130 | 3/1989 | Frimmel, Jr. | 379/88 |
| 4,872,197 | 10/1989 | Pemmaraju | 379/93 |
| 4,972,463 | 11/1990 | Danielson et al. | 379/91 |
| 4,995,074 | 2/1991 | Goldman et al. | 379/93 |
| 5,164,981 | 11/1992 | Mitchell et al. | 379/88 |

*Primary Examiner*—Jin F. Ng
*Assistant Examiner*—Jason Chan
*Attorney, Agent, or Firm*—Bourque, Daniel J.; Davis, Anthony M.; Michael J. Bujold

[57] ABSTRACT

A system comprising a local processor capable of accessing a host system typically comprising one database, is provided with a communication processor which controls synchronous serial communication between the host system and a plurality of synchronous devices in a varied range of clocked rates. The communication processor facilitates remoting of a single terminal having resident protocol conversion control capability, while a related plurality of terminals locally access a host system via a single host synchronous port.

9 Claims, 5 Drawing Sheets

REMOTE WORKSTATION USE WITH DATABASE RETRIEVAL SYSTEM

FIELD OF THE INVENTION

The present invention relates to a workstation terminal and in particular to a remote workstation terminal for operation with a database information retrieval system incorporating telephonic and computerized voice response units.

BACKGROUND OF THE INVENTION

Systems are known which facilitate access to databases of information while managing incoming and outgoing calls of a telephone communication system. Such systems typically comprise a host computer with mass storage capabilities for maintaining database information. A protocol converter facilitates conversion of synchronous data output from the host computer for manipulation and use on asynchronous terminals which access the host computer locally and which are coordinated by one or more port controllers.

A call management and database access system such as disclosed in U.S. Pat. No. 4,817,130 further incorporates a local processor which controls a telephone line control unit (LCU) that controls a plurality of lines connected between local switching means and the LCU. Typically the local processor has means for playing a recorded message to provide a voice response to the LCU and a calling party; means for generating and recognizing DTMF (touchtone) signals; and means for controlling the port controllers to control connection of the terminals to the local processor or to the protocol converter for communication with the host computer. Known systems, however, are of limited efficiency because limited database information is available to an intervening human operator so that the operator must re-initiate a- dialogue with a caller and then request database information via a local terminal.

In known systems, such as generally illustrated in FIG. 1A, communication between a host and a terminal or other device such as a printer, requires that all the equipment involved be capable of communication via an appropriate communication protocol as known in the art, such as SDLC or BISYNC. Protocol conversion is required, typically at the local processor or system controller level (C1), so that the asynchronous terminal (T) or device can use the information communicated by a synchronous port of the host processor(s). Information issued from the host is packaged, i.e. in SDLC in a "frame", with coded fields for identification, control and verification. The coded information must be unpackaged from the information usable by the asynchronous terminal. The unpackaging of data or information from the host to send to an asynchronous terminal and the packaging of data received from an async terminal to send to the host, is generally performed by a controller (Cl) having protocol conversion capabilities. The controller typically operates under host program control and considerable controller overhead can be required in packaging and unpackaging information transfers, negatively impacting the host.

As illustrated in FIG. 1B, a plurality of terminals (T1-Tn) or devices can access and be accessed through a controller (C2) via a single synchronous port (P1) of a synchronous host, which processes a packet or frame of information according to a particular protocol. When it is desired to access and receive information at a remote terminal (Tra) asynchronously from a host port (P2) via a telecommunications modem (M1, M2), an entire synchronous port of the host is occupied. Accordingly, the waste of resources can be significant. For instance, if the single synchronous port (P2) was capable of communicating with 8 terminals, the entire 8-terminal port would have to be dedicated to a modem for transmission even if only one terminal was desired for remote access. Such a configuration results in inefficient and costly allocation of resources, in addition to considerable processor overhead.

Further, where it is desired to access and receive information at a terminal (Trs) synchronously from a host port (P3) via a telecommunications modem (M1, M2) a controller (cont) at the remote cite is necessary to provide the protocol conversion. A required dedicated controller, in communication with the remote synchronous terminal Trs is an expensively inefficient hardware implementation.

SUMMARY OF THE INVENTION

The present invention provides efficient and low cost remote access to a database in a telephone communication and database information system by providing protocol conversion at a remote terminal to convert information transmitted to the remote terminal via a standard modem over dial-up or leased telephone lines.

According to the present invention, a local processor, capable of accessing a host system comprising at least one database, is provided with a communication processor which controls synchronous serial communication between the host system and a plurality of synchronous devices in a varied range of clocked rates. The communication processor facilitates remoting of a single terminal having resident protocol conversion control capability, while a related plurality of terminals locally access a host system via a single host synchronous port.

Features of the present invention include use of an off-the-shelf modem, such as a V.32 synchronous modem, to provide standard telecommunication between a proprietary system using a standard protocol such as SDLC to communicate with a remote workstation or device. Terminal or device resident protocol conversion reduces the conversion overhead normally associated with protocol conversion and reduces asynchronous communication traffic between the terminal and controller. Data is processed more quickly at the remote terminal which has resources dedicated to packaging and unpackaging coded information.

Further features of the invention include distribution of real-time transaction processing to remote terminals in a telephone/database information system such as described in commonly owned U.S. patent application Ser. No. 07/532,453, which is incorporated herein by reference.

DESCRIPTION OF THE DRAWING

These and further features of the present invention will be better understood by reading the following detailed description taken together with the drawings, in which.

DETAILED DESCRIPTION

Figure 1A:
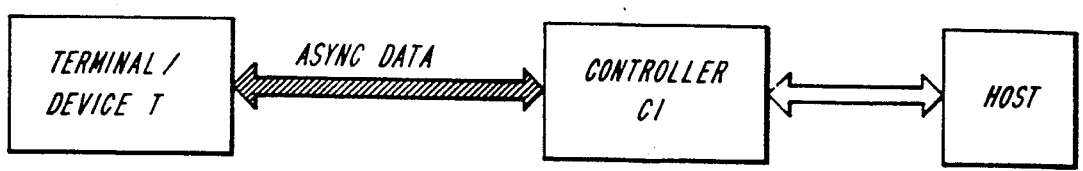
FIGS. 1A and 1B are a simplified block diagrams of systems according to the prior art.
Figure 1B:
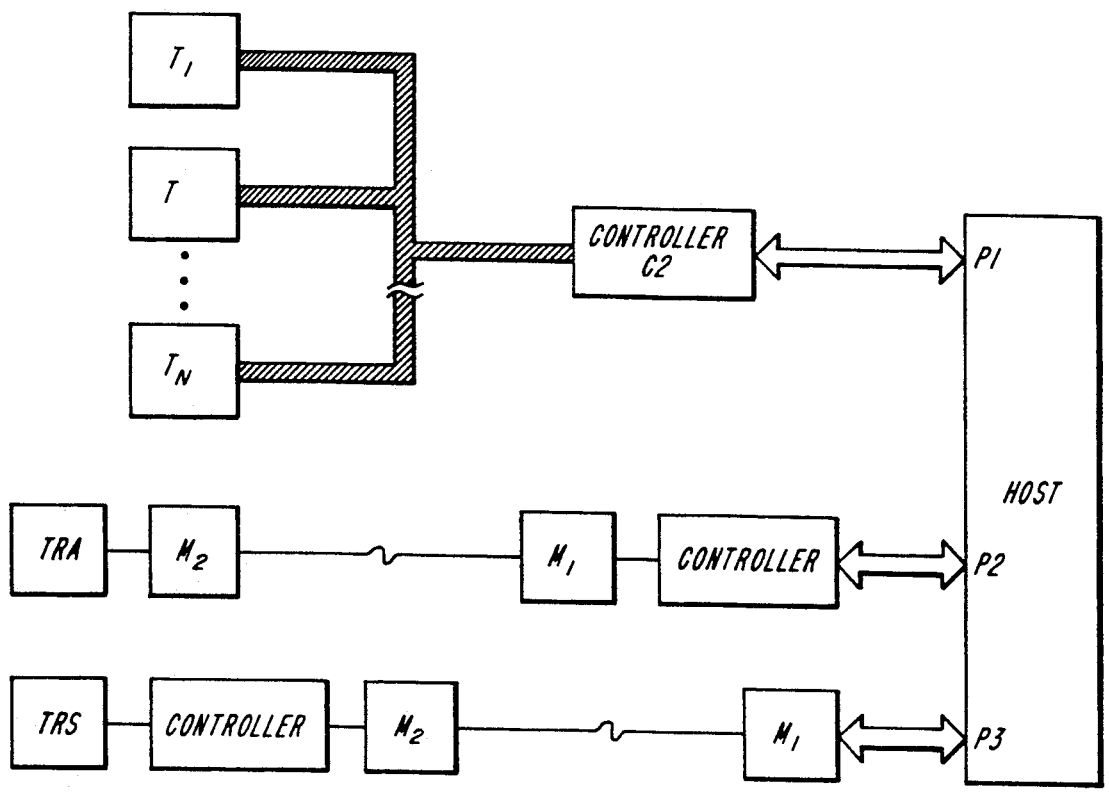
Figure 2:
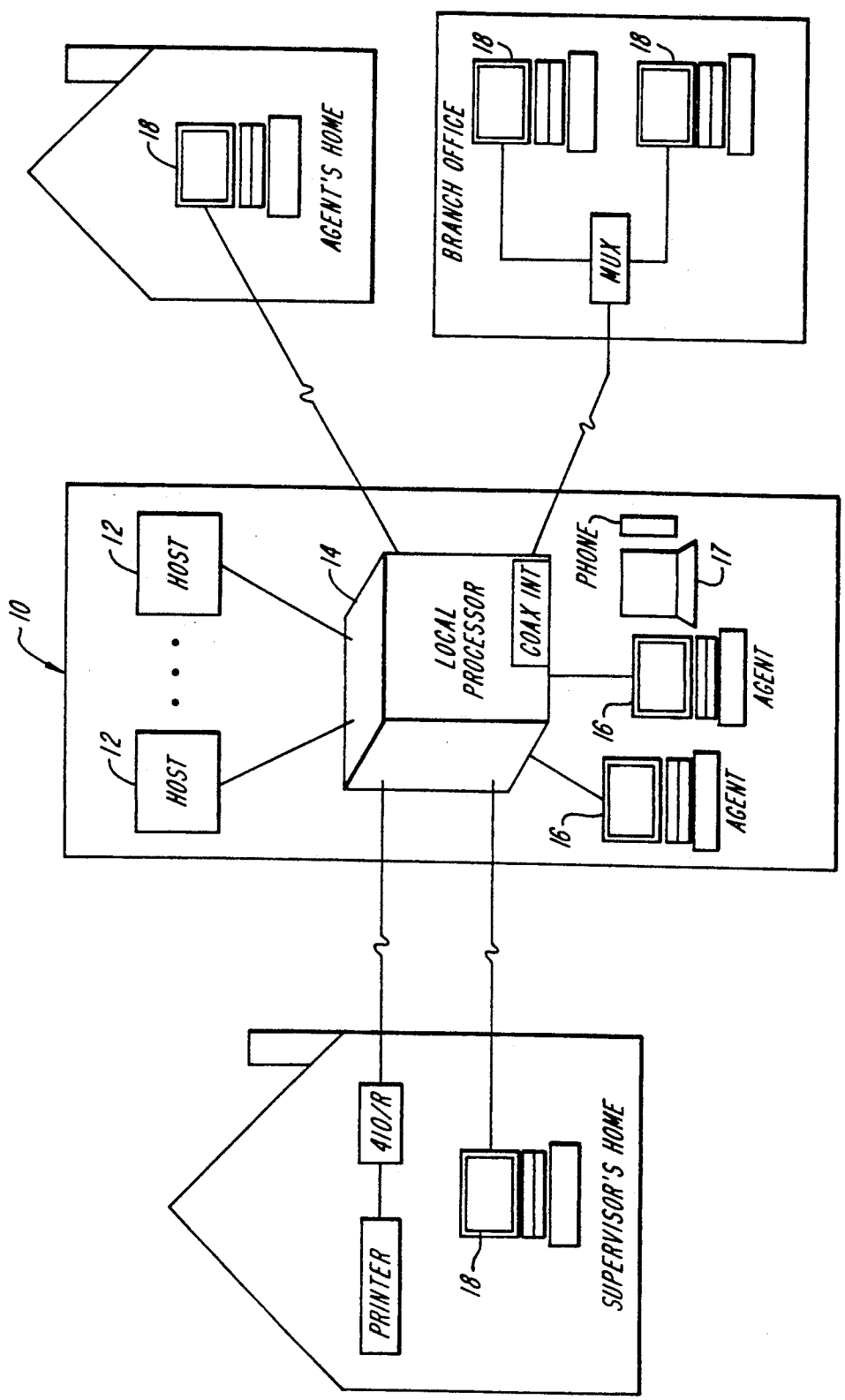
FIG. 2 is a diagrammatic representation of a communication system implementing remote access to a host system and database(s) through a local processor.

As illustrated in FIG. 2, an automated telephone and database system according to the present invention, comprises a centralized facility 10 comprising at least one host system 12 which maintains at least one database to be accessed by an operator or caller as described in the referenced application. A local processor 14 acts as a resource server to provide, among other things, a gateway function for coordinating access to various networked facilities. The local processor 14 also comprises capabilities for data switching between various system components, such as between the host(s) 12 and one or more local terminals 16 and 17. The local processor has capabilities to provide protocol conversion for the local terminals 17, tied to the local processor 14, that have no integral protocol conversion capabilities. Local smart terminals with protocol conversion capabilities 16, are also connected to the local processor, through a coaxial interface. Remote terminals 18 are supported by the local processor 14 through a local processor resident communication processor 20, discussed hereinafter.

Figure 3:
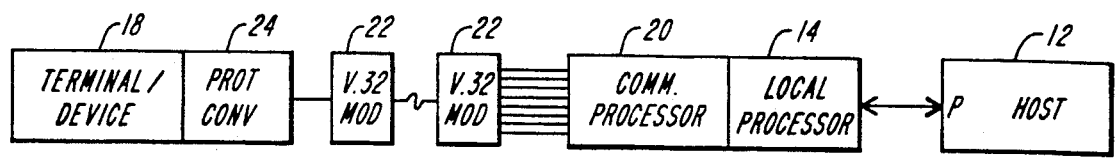
FIG. 3 is a block diagram of a data path from host to remote terminal in the system of FIG. 2.

Referring now to FIGS. 2 and 3, the system according to the invention permits the host system(s) 12 to be accessed by remote terminals 18 via standard telecommunications devices. The remote terminals 18, which may reside in branch offices and/or agent's or supervisor's homes, can have all the capabilities of the local terminals 16. The local processor resident communication processor 20 supports the remote terminals by providing a serial interface to the standard telecommunication device, in this case a V.32 modem. The remote terminals 18 comprise terminal resident protocol conversion capabilities 24, as discussed hereinafter.

The operator terminals, local or remote, can comprise any standard video terminal (i.e. dumb terminal) or a programmable computer terminal such as an IBM PC or other workstation keyboard/controller combination. Typically, the terminal is accompanied by a separate or integrated telephone apparatus. In a preferred embodiment, the terminals are enhanced workstation processors, such as Davox Series 4900/5900 Intelligent Workstations which are Motorola 68000 based workstation/processors having an integrated telephone and which perform complex telephone, protocol emulation and data processing tasks.

Figure 4:
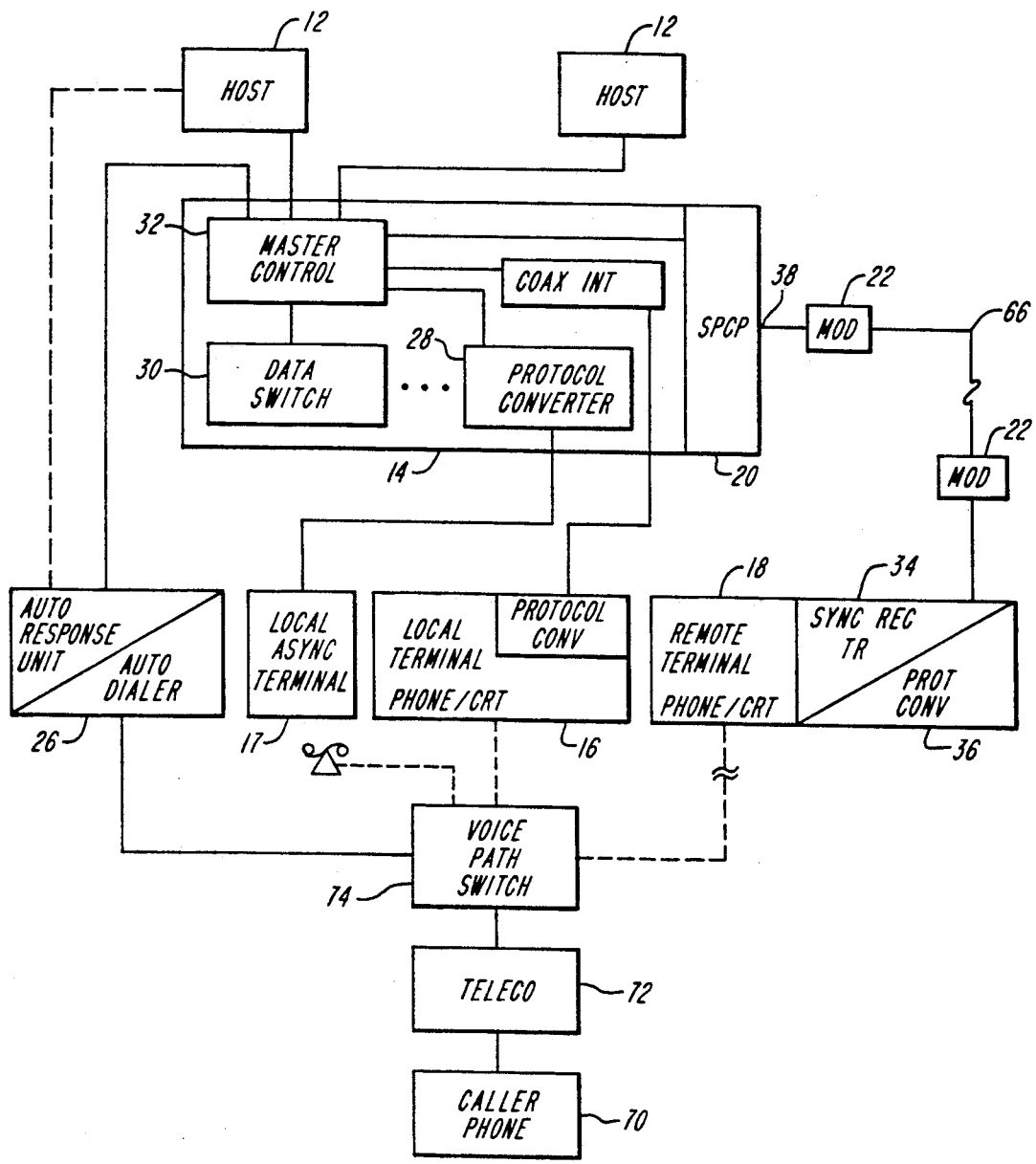
FIG. 4 is a block diagram of an illustrative embodiment of a system having a host system accessed from a remote terminal through a local processor integrated with a voice response unit.

The terminals 16, 17 and 18, referring now to FIG. 4, permit an operator to interface with the telephone system and host resident database, so as to permit the operator access to host information and to enable the operator, under system supervision, to communicate with a caller who may be making a query concerning information contained in the database. The local processor 14, or more particularly an integrated data switch 30, directs data between a particular host 12 and an operator terminal or between a host 12 and a voice response unit/auto dialer 26. The local processor may also direct data between other system facilities, such as between the voice response unit/auto dialer 26 and an operator terminal.

Protocol conversion capabilities 28 within the local processor 14 provide protocol conversion as known in the art, for the local terminals 17. Data frames destined from the host 12 to the remote terminals 18 are routed by a master control function 32 within the local processor 14, to the local processor resident synchronous communication processor 20. The communication processor 20 passes the information serially to the standard telecommunication device. In the illustrative embodiment the communication processor 20 transmits data according to the RS-232 standard to a V.32 modem. The information transmitted by the modem is received by a second modem 22 connected to a synchronous receiver 34 integral with remote terminal 18. The information received, in the case of the remote terminal, is packaged in a frame according to SDLC and must be unpackaged by terminal resident protocol conversion capabilities 36.

The local processor resident communication processor 20 is a synchronous peripheral communication processor SPCP which comprises eight Direct Memory Access or DMA assisted synchronous serial communication ports 38. DMA facilitates higher character throughput while minimizing host processor intervention in the transfer of information to the remote terminals 18. The local processor 20 uses a Z80 microprocessor 40 and associated peripheral components to implement the eight serial ports which support synchronous devices in a varied range of clock rates from 9600 to 400k.

Figure 5A:
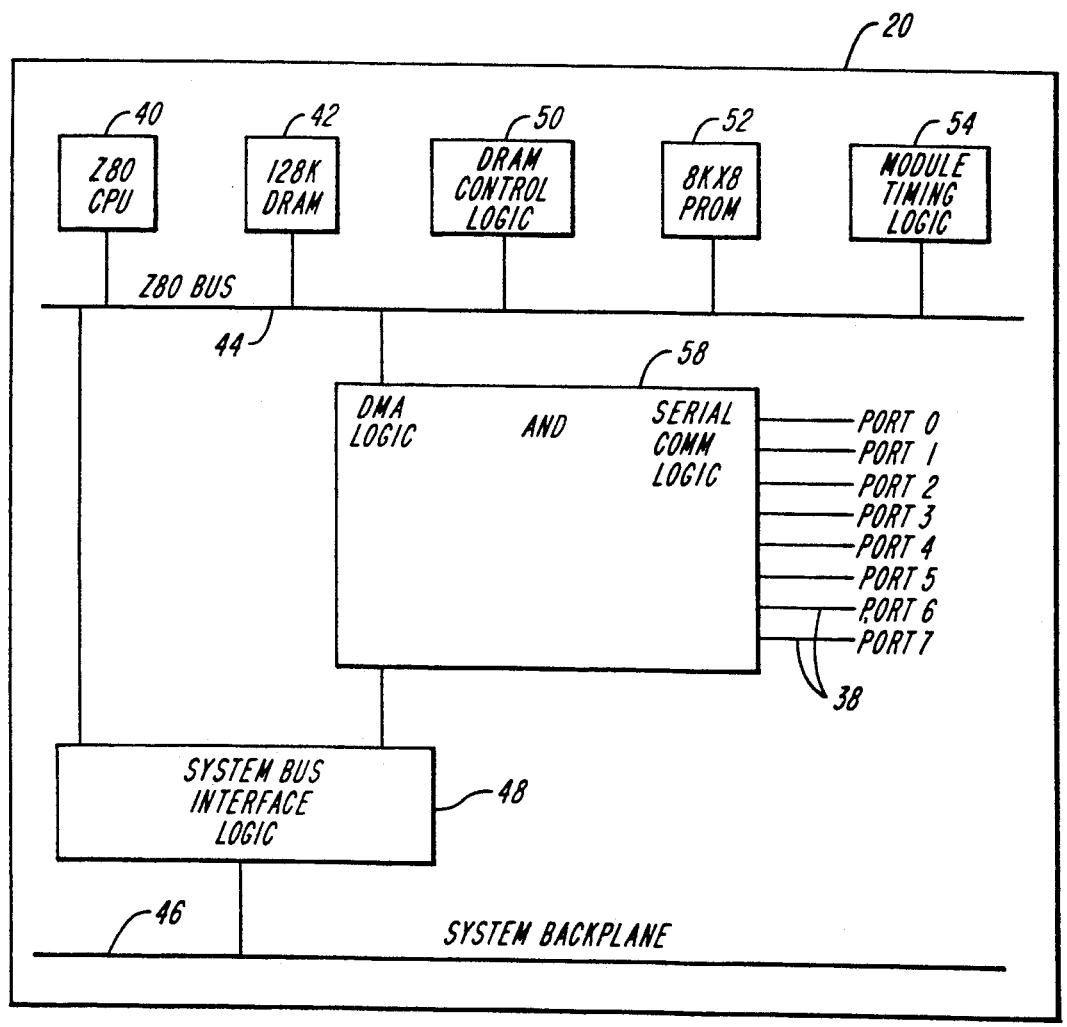
FIG. 5A is a block diagram of a synchronous peripheral communication processor for integration with the local processor of FIG. 2.
Figure 5B:
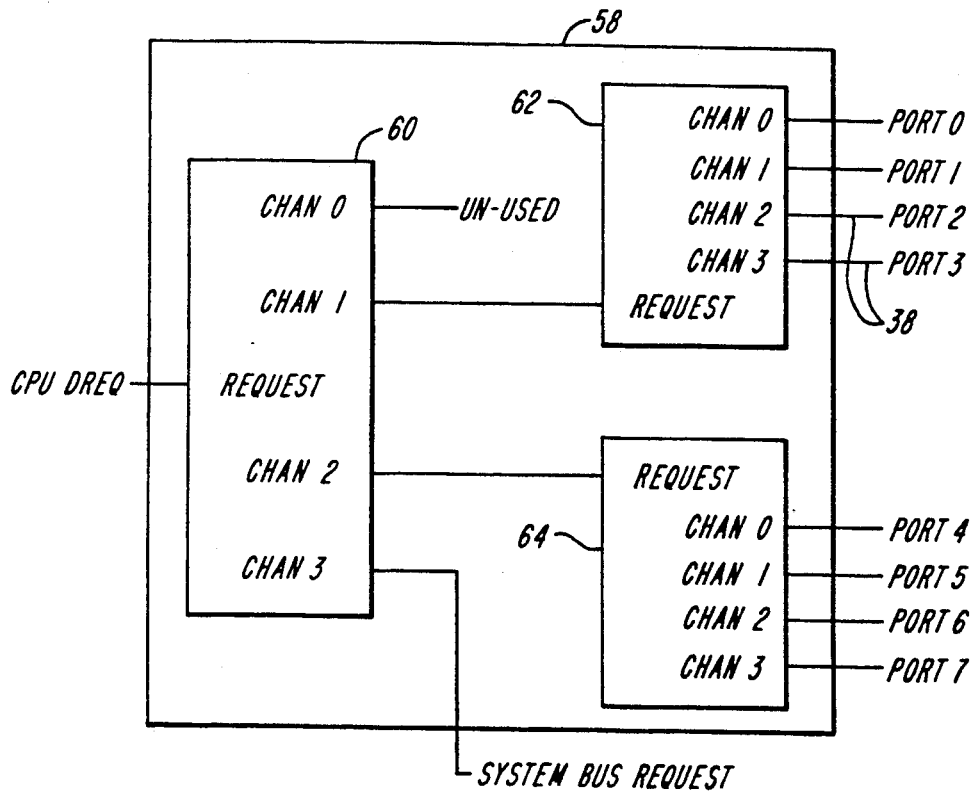
FIG. 5B is a block diagram of DMA serial communication facilities of the synchronous peripheral communication processor of FIG. 5A.

A block diagram of the communication processor is illustrated in FIGS. 5A and 5B. Addressable memory of 128K bytes of dynamic RAM 42 is available and allocated for facilitating 8-bit instruction transfers on an 8-bit Z80 bus 44. Transfers with the local processor 20 are done on a 16-bit system bus 46 which is accessible to the synchronous peripheral communication processor 20 through system bus interface logic 48 which has DMA capability and functions to transform local processor 20 bus 46 arbitration signals to Z80 bus 44 signals. Status and control of the memory 42 is handled by control logic 50 comprising a pair of addressable registers. Programmable read only memory 52 is provided for processor initialization. An oscillator and associated divider circuitry comprise module timing logic 54 which provides various clock signals for elements of the synchronous peripheral control processor 20.

The eight serial ports 38 are provided and controlled by DMA logic and serial communication logic 58. Three DMA chips are configured in a cascaded architecture to provide a separate DMA capability for each of eight communication ports 38. A first DMA chip 60, cascade services a second DMA chip 62 and a third DMA chip 64. The first DMA chip 60 also services the system bus interface logic 48 and is interfaced to the Z80 CPU 40. As illustrated in FIG. 5B, the DMA channels are allocated such that a first and second channel of the first DMA chip 60, request the second DMA chip 62 and the third DMA chip 64, respectively. The channels of the second DMA chip 62 and the third DMA chip 64 provide the eight serial ports 38 The eight serial ports 38 are operated in the single cycle mode so that the CPU 40 can not be locked out of bus access for periods exceeding the RAM 42 refresh cycle or the byte transfer period of a synchronous peripheral communication processor 20 data byte.

For purposes of remoting a workstation as discussed hereinbefore, a V.32 modem 22 is attached to a serial port 38 and transmits data onto a telephone line 66 for transmission to a compatible modem 22 at a remote site, such as a workers home, branch office or supervisors home.

The remote terminal 18, as exemplarily illustrated in FIG. 4, has means for receiving packaged data from the host 12 through the local processor 14 synchronous peripheral communication processor 20. In the illustrative embodiment, shown in FIG. 6, the means for receiving is a synchronous receiver 34 having capabilities which facilitate synchronous receipt of the transmitted information in accordance with the EIA RS-232 standard. According to the invention, the remote terminal 18 also has protocol conversion capabilities 36 which enable the remote terminal 18 to unpackage data sent from the host according to a communications protocol known in the art, such as SDLC, BISYNC, or Token Ring through the processor 14. Providing protocol conversion at the remote terminal 18 frees the host and/or local processor from the burden of unpackaging the data from the protocol specific data structure, such as the SDLC "frame". Unpackaged data, in typically ASCII or EBCDIC coded form, is available from the protocol converter 36 for use by the terminal hardware 18. The protocol converter 36 also takes the useable data from the terminal 18 and packages it, according to the protocol being used, for transmission by transmitter circuitry 35 and use by the local processor 14 or host 12.

The system according to the invention permits one or a plurality of remote users to have access to a telephone information and database system, and to have available all the features available to local terminal users. Further, the remote users having intelligent terminals have the advantage of distributed processing speed and will not be at the mercy of the local processor slowed by protocol conversion and processing overhead and additional data traffic added by the remote users.

Referring back to the simplified block diagram of FIG. 4, the host system 12 supports one or more databases of information, such as information on customer accounts or billing. A party desiring information typically will call on a standard touchtone telephone 70 through telephone company equipment 72. A voice path switch 74, such as a private branch exchange (PBX) receives the call at a central location. The voice path switch 74 may switch the incoming caller to a voice response unit 26, which establishes a voice link with the incoming caller and may prompt the caller to provide certain information regarding the nature of the call. The voice response unit receives the touchtone signal responses from the caller and converts them to data signals for interpretation and manipulation according to system requirements. The voice response unit may elicit further information from the caller or transfer the caller to an operator or provide information requested by the caller from the database. To access the database to provide information, the voice response unit 26 may establish a direct data path with the host 12 or a data path may be established through the master control function 32 of the local processor 14.

Where operator intervention is desirable, the voice/data path established between the incoming caller and the voice response unit 26 may be redirected to establish a voice/data path between the caller 70, through the voice path switch 74, to an operator terminal. If a local terminal 16 is available, as described in the referenced application, the voice response unit redirects a data path through the local processor 14. The operator at the local terminal 16 is then available to the caller to get information from the database supported by the host 12. Such information is obtained by the operator using the local terminal 16 which communicates with the host, through the protocol converter 28 under the control of the master controller of the local processor. Similarly, a remote terminal can be used to connect an operator to host and autodialer data for an outbound call for which an operator is phone connected.

If a remote terminal is available or desires to access the system database(s), the voice response unit or autodialer directs a data path between the remote terminal 18 and the host 12, through the local processor 14. The master controller 32 controls the data path between the host 12 and the synchronous peripheral communication processor 20, which establishes a DMA channel with the host 12. The synchronous peripheral communication processor 20 serial channel 38 is EIA RS-232 compatible for communication over a telephone line via a V.32 modem 22. Another V.32 modem proximate to the remote terminal 18 takes data off the telephone line and passes the data to an RS-232 synchronous receiver 34.

Figure 6:
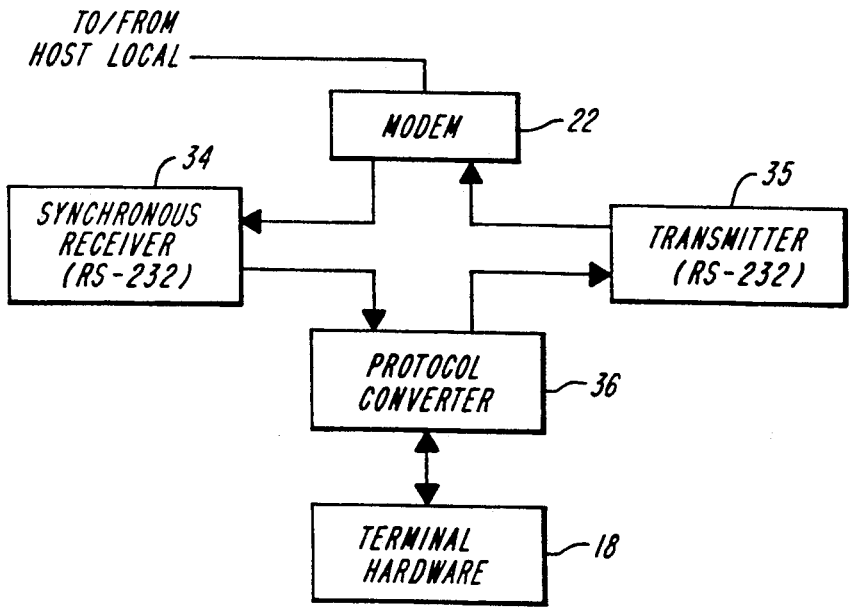
FIG. 6 is a block diagram of a synchronous receiver and protocol converter for integration as a terminal resident protocol converter in the remote terminal of FIG. 2.

The data received by the synchronous receiver 34, illustrated in FIG. 6, has been transmitted from the host 12 through the local processor 14 in accordance with a particular data link level communication protocol used by the host and local processor. In the case of SDLC protocol common to IBM and compatible equipment, the data is packaged in a frame comprising eight flag bits, followed by eight address bits and eight control bits. The data is followed by sixteen check bits and an 8-bit ending flag. The headers and trailers comprising the control bits, check bits etc, preceding and following the data, are not useable by the remote terminal 18 and must be stripped from the data frame. The protocol converter 36 unpackages the useable data from the SDLC frame so that such data can be processed by the terminal 18.

When the operator communicates or transfers information from the remote terminal 18 to the local processor 14 or host 12 the data is repackaged by the protocol converter 36. The frame, in accordance with the desired protocol, is transmitted from the remote terminal 18 by a resident transmitter 35, which passes the data to the V.32 modem for communication via telephone line to the modem attached to the synchronous peripheral communication processor 20. At the communication processor 20, the frame can be directed to the host 12 in accordance with the master control function of the local processor 14.

While the data transfers according to the illustrative embodiment herein are described as packaging and unpackaging data frames according to the SDLC and such SDLC protocol conversion is done at the remote terminal level so as to enhance speed and reduce processor overhead, it will be appreciated by those of ordinary skill in the art that protocol conversion of data packaged in accordance with other industry standard and proprietary data communication schemes can be undertaken in accordance with the present invention.

Although the present invention is described in the context of a telephone database information system, other applications can be appreciated by one of skill in the art.

Although the invention has been shown and described with respect to exemplary embodiments thereof, various other changes, omissions and additions in the form and detail thereof may be made therein without departing from the spirit and scope of the invention.

What is claimed is:

1. A computerized system wherein at least one host computer having at least one communication port, is accessed by at least one synchronous remote device, said system comprising:
    a local processor coupled to said at least one host computer, said local processor coupled to said at least one host computer so as to occupy only one of said at least one communication port of said at least one host computer, said local processor including a synchronous communication processor which transmits synchronous information in a synchronous protocol format to said at least one synchronous remote device utilizing a synchronous data link standard;
    a first telecommunications device, responsive to said local processor, said first telecommunications device transferring said synchronous information in said synchronous protocol format from said local processor to a telecommunication line in said synchronous data link standard, and from said telecommunication line to said local processor, said synchronous information including remote device useable display data and control information;
    a second telecommunications device, responsive to said first telecommunications device and said at least one synchronous remote device, said second telecommunications device transferring said synchronous information in said synchronous protocol format from said telecommunication line in said synchronous data link standard to said at least one synchronous remote device, and from said at least one synchronous remote device to said telecommunication line; and
    said at least one synchronous remote device located remotely from said local processor and said at least one host computer, said at least one synchronous remote device operable for receiving and processing said information received in said synchronous protocol format, and having a resident protocol convertor, for directly converting said synchronous information received from said local processor in said synchronous protocol format to a remote device usable format, and for converting information received from said at least one synchronous remote device from said remote device useable format to said synchronous protocol format for sending information directly to said at least one host computer through said local processor without information protocol format conversion.

2. The system of claim 1 wherein said at least one host computer comprises at least one database.

3. The system of claim 1 wherein said at least one synchronous remote device is a remotely located printer.

4. The system of claim 1 wherein said first and second telecommunications devices comprise at least one V.32 standard modem.

5. The system of claim 1 wherein said at least one synchronous remote device is a remotely located workstation.

6. The system of claim 1 wherein said synchronous communication processor is an intelligent synchronous port controller which communicates via at least eight synchronous ports.

7. The system of claim 1 wherein said synchronous communication processor comprises a plurality of cascaded direct memory access devices which implement at least eight synchronous ports.

8. A computerized system wherein at least one host computer having at least one synchronous port and supporting at least one database of information, is accessed by at least one synchronous remote device and wherein a local processor having a resident protocol converter accesses said at least one host computer via only one of said at least one synchronous port, said system comprising:
    said local processor including a synchronous communications processor coupled to said local processor, said synchronous communication processor having a plurality of synchronous remote device ports for transmitting and receiving synchronous information in a synchronous protocol format to and from said at least one host computer by up to a corresponding plurality of synchronous remote devices via said only one of said at least one synchronous port of said local processor in a synchronous data link standard, said synchronous information including remote device useable display data and control information;
    a voice response unit, responsive to telephone signals received from an outside telephone apparatus, said voice response unit facilitating interactive data exchange between an outside party using said outside telephone apparatus and said at least one database;
    a first telecommunications device, responsive to said synchronous communication processor, said first telecommunications device transferring said synchronous information in said synchronous protocol format from said synchronous communication processor to a telecommunication line in said synchronous data link standard, and from said telecommunication line to said synchronous communication processor;
    a second telecommunications device, responsive to said first telecommunications device and said at least one synchronous remote device, said second telecommunications device transferring said synchronous information in said synchronous protocol format from said telecommunication line in said synchronous data link standard to said at least one synchronous remote device, and from said at least one synchronous remote device to said telecommunication line; and
    said at least one synchronous remote device located remotely from said local processor and said at least one host computer, said at least one synchronous remote device operable for receiving and processing said information received in said synchronous protocol format, and having a resident protocol convertor, for directly converting said synchronous information received from said local processor in said synchronous protocol format to a remote device usable format, and for converting information received from said at least one synchronous remote device from said remote device useable format to said synchronous protocol format for sending information directly to said at least one host computer through said local processor without information protocol format conversion.

9. A computerized system wherein at least one host computer having at least one synchronous port and supporting at least one database of information, is accessed by at least one synchronous remote device and wherein a local processor having a resident protocol converter accesses said at least one host computer via only one of said at least one synchronous port, said system comprising:

said local processor including a synchronous communications processor coupled to said local processor, said synchronous communication processor having a plurality of synchronous remote device ports for transmitting and receiving synchronous information in a synchronous protocol format to and from said at least one host computer by up to a corresponding plurality of synchronous remote devices via said only one of said at least one synchronous port of said local processor in a synchronous data link standard;

an automated dialer, coupled to said local processor, for placing outbound telephone calls under direction of at least said local processor;

a first telecommunications device, responsive to said synchronous communication processor, said first telecommunications device transferring said synchronous information in said synchronous protocol format from said synchronous communication processor to a telecommunication line in said synchronous data link standard, and from said telecommunication line to said synchronous communication processor, said information including remote device useable display data and control information;

second telecommunications device, responsive to said first telecommunications device and said at least one synchronous remote device, said second telecommunications device transferring said synchronous information in said synchronous protocol format from said telecommunication line in said synchronous data link standard to said at least one synchronous remote device, and from said at least one synchronous remote device to said telecommunication line; and said at least one synchronous remote device located remotely from said local processor and said host computer, said at least one synchronous remote device operable for receiving and processing said information received in said synchronous protocol format, and having a resident protocol convertor, for directly converting said synchronous information received from said local processor in said synchronous protocol format to a remote device usable format, and for converting information received from said at least one synchronous remote device from said remote device useable format to said synchronous protocol format for sending information directly to said at least one host computer through said local processor without information protocol format conversion.

* * * * *